United States Patent
Hatsuda et al.

(10) Patent No.: US 10,392,005 B2
(45) Date of Patent: Aug. 27, 2019

(54) HYBRID ELECTRIC VEHICLECAPABLE OF SWITCHING DRIVING MODES BASED ON GRADIENT

(71) Applicant: HONDA MOTOR CO., LTD., Tokyo (JP)

(72) Inventors: Junpei Hatsuda, Wako (JP); Shigeki Kazehare, Wako (JP); Masashi Eto, Wako (JP); Takanori Kon, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 15/389,850

(22) Filed: Dec. 23, 2016

(65) Prior Publication Data

US 2017/0182998 A1 Jun. 29, 2017

(30) Foreign Application Priority Data

Dec. 25, 2015 (JP) .................................. 2015-253973

(51) Int. Cl.
*B60L 50/16* (2019.01)
*B60W 10/02* (2006.01)
(Continued)

(52) U.S. Cl.
CPC ............. *B60W 20/40* (2013.01); *B60L 50/16* (2019.02); *B60L 58/13* (2019.02); *B60W 10/02* (2013.01);
(Continued)

(58) Field of Classification Search
None
See application file for complete search history.

(56) References Cited

U.S. PATENT DOCUMENTS 6,135,920 A * 10/2000 Kamiya ................ B60W 10/06
477/185
6,177,773 B1 * 1/2001 Nakano .................... B60K 6/28
318/376
(Continued)

FOREIGN PATENT DOCUMENTS

CN 103448713 A 12/2013
CN 104619565 A 5/2015
(Continued)

OTHER PUBLICATIONS

Machine Translation of JP 2011-88595 (Year: 2011).*
(Continued)

*Primary Examiner* — Navid Ziaeianmehdizadeh
(74) *Attorney, Agent, or Firm* — Westerman, Hattori, Daniels & Adrian, LLP (57) ABSTRACT

A hybrid electric vehicle including a gradient acquiring portion which acquires a gradient of a road surface on which the vehicle is running, and a control portion which determines whether the vehicle runs on a first driving by means of power from the motor by releasing the engagement and disengagement portion, or on a second driving by means of power from at least the internal combustion engine by applying the engagement and disengagement portion. The control portion restricts a switch from the second driving to the first driving when the gradient of the downward slope is equal to or greater than a threshold value. The control portion holds the second driving when the switch from the second driving to the first driving is restricted, even though the control portion obtains a request for a switch to the first driving while the vehicle runs the downward slope on the second driving.

7 Claims, 11 Drawing Sheets

(51) Int. Cl.
*B60W 10/06* (2006.01)
*B60W 10/08* (2006.01)
*B60W 20/12* (2016.01)
*B60W 20/14* (2016.01)
*B60W 20/40* (2016.01)
*B60W 30/18* (2012.01)
*B60L 58/13* (2019.01)

(52) U.S. Cl.
CPC ............ *B60W 10/06* (2013.01); *B60W 10/08* (2013.01); *B60W 20/12* (2016.01); *B60W 20/14* (2016.01); *B60W 30/18127* (2013.01); *B60W 30/18136* (2013.01); *B60L 2240/12* (2013.01); *B60L 2240/423* (2013.01); *B60L 2240/443* (2013.01); *B60L 2240/507* (2013.01); *B60W 2520/10* (2013.01); *B60W 2550/142* (2013.01); *B60W 2710/021* (2013.01); *B60W 2710/244* (2013.01); *B60Y 2300/91* (2013.01); *B60Y 2400/112* (2013.01); *Y02T 10/6286* (2013.01); *Y02T 10/7258* (2013.01); *Y10S 903/914* (2013.01)

(56) References Cited

U.S. PATENT DOCUMENTS

| | | | | |
|---|---|---|---|---|
| 10,077,040 | B2* | 9/2018 | Chen | B60W 10/06 |
| 2007/0112496 | A1* | 5/2007 | Ji | B60K 6/445 |
| | | | | 701/70 |
| 2008/0300762 | A1* | 12/2008 | Crombez | B60L 7/18 |
| | | | | 701/70 |
| 2009/0112386 | A1* | 4/2009 | Saitoh | B60L 11/1887 |
| | | | | 701/22 |
| 2010/0332062 | A1* | 12/2010 | Goto | B60K 6/485 |
| | | | | 701/22 |
| 2011/0065548 | A1* | 3/2011 | Yu | B60W 10/06 |
| | | | | 477/203 |
| 2011/0313647 | A1* | 12/2011 | Koebler | B60L 15/2045 |
| | | | | 701/123 |
| 2012/0330505 | A1* | 12/2012 | Tsumori | B60W 10/06 |
| | | | | 701/36 |
| 2013/0296105 | A1 | 11/2013 | Grutter et al. | |
| 2013/0296130 | A1 | 11/2013 | Banker et al. | |
| 2014/0163799 | A1* | 6/2014 | Niimi | B60K 6/445 |
| | | | | 701/22 |
| 2014/0210216 | A1* | 7/2014 | Konishi | B60K 6/48 |
| | | | | 290/38 R |
| 2014/0336860 | A1* | 11/2014 | Saitoh | B60W 10/11 |
| | | | | 701/22 |
| 2014/0336893 | A1 | 11/2014 | Ideshio et al. | |
| 2014/0350759 | A1* | 11/2014 | Kobayashi | B60L 11/1803 |
| | | | | 701/22 |
| 2015/0032317 | A1* | 1/2015 | Kato | B60W 10/08 |
| | | | | 701/22 |
| 2015/0126328 | A1 | 5/2015 | Banker et al. | |
| 2015/0224981 | A1 | 8/2015 | Fujishiro et al. | |
| 2015/0314775 | A1* | 11/2015 | Dextreit | B60W 50/0097 |
| | | | | 701/22 |
| 2016/0129904 | A1* | 5/2016 | Shin | B60W 20/40 |
| | | | | 701/22 |
| 2016/0375892 | A1* | 12/2016 | Kim | B60W 20/13 |
| | | | | 701/22 |

FOREIGN PATENT DOCUMENTS

| | | |
|---|---|---|
| DE | 10 2013 009 279 A1 | 12/2014 |
| EP | 2 664 511 A1 | 11/2013 |
| JP | 2000-102110 A | 4/2000 |
| JP | 2009-280170 A | 12/2009 |
| JP | 2011-88595 A | 5/2011 |

OTHER PUBLICATIONS

Extended European Search Report dated May 24, 2017, issued in counterpart European Patent Application No. 16206253.3. (8 pages).
Office Action dated Sep. 27, 2018, issued in counterpart Chinese Application No. 201611198298.7, with English translation. (16 pages).
Office Action dated Aug. 29, 2017, Japanese Application No. 2015-253973, with English translation (5 pages).

* cited by examiner

HYBRID ELECTRIC VEHICLE CAPABLE OF SWITCHING DRIVING MODES BASED ON GRADIENT

TECHNICAL FIELD

The present invention relates to a hybrid electric vehicle.

BACKGROUND ART

In a hybrid electric vehicle described in Patent Literature 1, a regeneration control apparatus activates a motor to operate as a generator when the hybrid electric vehicle which uses an engine and the motor as power sources is decelerated to charge a motor driving battery based on regeneration energy which is determined according to the degree of deceleration, and this regeneration control apparatus corrects the regeneration energy which is charged from the motor to the battery according to the gradient of a road surface of a downward slope when the hybrid electric vehicle climbs down on the slope. By performing the correction, it is possible to suppress the occurrence of a situation where the battery is charged so full that regenerative braking is prevented from being performed while the hybrid electric vehicle is climbing down on the downward slope where there are many opportunities of decelerating regeneration, whereby the driver can be prevented from feeling a sensation of physical disorder which the driver would otherwise feel as a result of the loss of a feeling of deceleration. By setting a gear ratio of an automatic transmission according to the gradient of the road surface of the downward slope where the hybrid electric vehicle climbs down, the driver can obtain a constant feeling of deceleration while the hybrid electric vehicle is climbing down the downward slope.

RELATED ART LITERATURE

Patent Literature

Patent Literature 1: JP-A-2000-102110

SUMMARY OF THE INVENTION

Problem that the Invention is to Solve

According to the hybrid electric vehicle disclosed in Patent Literature 1 which performs the regeneration control, it is possible to obtain the stable feeling of deceleration by correcting the regeneration energy and setting the gear ratio of the automatic transmission according to the gradient of the road surface of the downward slope while the hybrid electric vehicle climbs down the downward slope. However, since no brake is applied by using the engine brake, the driver cannot obtain a feeling of deceleration through hearing.

According to the technique disclosed in Patent Literature 1, it is possible to suppress the occurrence of a situation where the battery is charged so full that regenerative braking is prevented from being performed while the hybrid electric vehicle is climbing down on the downward slope where there are many opportunities of decelerating regeneration. However, there is a situation where the battery is charged full inevitably even though the correction is made to reduce the regeneration energy depending upon the state of charge of the battery and the distance and gradient of the downward slope on which the hybrid electric vehicle climbs down. As this occurs, it is not possible to obtain the stable feeling of deceleration.

An object of the invention is to provide a hybrid electric vehicle which can provide a feeling of deceleration through hearing and a stable feeling of deceleration while the hybrid electric vehicle is climbing down on a downward slope.

Means for Solving the Problem

With a view to achieving the object, according to an invention of (1), there is provided a hybrid electric vehicle including:
an internal combustion engine (for example, an internal combustion engine ENG in an embodiment which will be described later);
a motor (for example, a motor-generator MG in the embodiment); and
an engagement and disengagement portion (for example, a clutch CL2 in the embodiment) which engages and disengages a power transmission path from the internal combustion engine to a driving wheel,
wherein the hybrid electric vehicle is driven by means of power from at least one of the internal combustion engine and the motor,
wherein the hybrid electric vehicle comprises:
a gradient acquiring portion (for example, an inclination sensor 105 in the embodiment) which acquires a gradient of a road surface on which the hybrid electric vehicle is running; and
a control portion (for example, a management ECU 107 in the embodiment) which determines whether the hybrid electric vehicle runs on a first driving (for example, an EV driving in the embodiment) by means of power from the motor by releasing the engagement and disengagement portion, or the hybrid electric vehicle runs on a second driving (for example, an ENG driving in the embodiment) by means of power from at least the internal combustion engine by applying the engagement and disengagement portion,
wherein the control portion determines on the second driving based on a gradient, which is obtained by the gradient acquiring portion, of a downward slope where the hybrid electric vehicle runs.

According to an invention of (2), there is provided a hybrid electric vehicle including:
an internal combustion engine (for example, an internal combustion engine ENG in an embodiment which will be described later);
a motor (for example, a motor-generator MG in the embodiment); and
an engagement and disengagement portion (for example, a clutch CL2 in the embodiment) which engages and disengages a power transmission path from the internal combustion engine to a driving wheel,
wherein the hybrid electric vehicle drives by means of power from at least one of the internal combustion engine and the motor,
wherein the hybrid electric vehicle comprises:
a gradient acquiring portion (for example, an inclination sensor 105 in the embodiment) which acquires a gradient of a road surface on which the hybrid electric vehicle is running; and
a control portion (for example, a management ECU 107 in the embodiment) which determines whether the hybrid electric vehicle runs on a first driving (for example, an EV driving in the embodiment) by means of power from the motor by releasing the engagement and disengagement portion, or the hybrid electric vehicle runs on a second driving (for example, an ENG driving in the embodiment) by means of power from at least the internal combustion engine by applying the engagement and disengagement portion, wherein the control portion restricts a switch from the second driving to the first driving based on a gradient, which is obtained by the gradient acquiring portion, of a downward slope where the hybrid electric vehicle is running.

According to an invention of (3) or (7) in the invention according to (1) or (2), the control portion switches from the first driving to the second driving when the control portion obtains a request for a switch to the second driving while the hybrid electric vehicle runs a downward slope on the first driving.

According to an invention of (4) or (8) in the invention according to (1) or (2), the control portion restricts a switch from the second driving to the first driving when the gradient of the downward slope which is obtained by the gradient acquiring portion is equal to or greater than a threshold value, and the control portion holds the second driving when the switch from the second driving to the first driving is restricted, even though the control portion obtains a request for a switch to the first driving while the hybrid electric vehicle runs the downward slope on the second driving.

According to an invention of (5) or (9), in the invention according to (1) or (2), the control portion determines on the first driving irrespective of a gradient of the downward slope which is obtained by the gradient acquiring portion when a driving speed of the hybrid electric vehicle is less than a threshold value.

According to an invention of (6) or (10), in the invention according to (1) or (2), the control portion controls the motor to regenerate while the hybrid electric vehicle runs the downward slope on the first driving or on the second driving.

Advantage of the Invention

According to the invention of (1), since the internal combustion engine provides the braking force when the hybrid electric vehicle which is running on the second driving is decelerated, the exhaust sound of the internal combustion engine can be obtained in the event that the hybrid electric vehicle is caused to run on the second driving based on the gradient of the downward slope where the hybrid electric vehicle runs. Since the driver of the hybrid electric vehicle can obtain or sense a feeling of deceleration through hearing from this exhaust sound, the driver can be given a feeling of sporty drive.

Since there is a difference between a feeling of deceleration obtained during the first driving and a feeling of deceleration obtained during the second driving, hunting or fluctuations are generated in the feeling of deceleration when the driving is switched over frequently between the first driving and the second driving. However, as long as the condition based on the gradient of the downward slope is satisfied in the invention of (1), it is possible to provide the stable feeling of deceleration by allowing the hybrid electric vehicle to run on the second driving.

According to the invention of (2), by restricting the switch from the second driving to the first driving based on the gradient of the downward slope where the hybrid electric vehicle runs, the hybrid electric vehicle is caused to hold the second driving even though the control portion obtains the request for a switch to the first driving while the hybrid electric vehicle runs the downward slope on the second driving. Since the internal combustion engine provides the braking force while the hybrid electric vehicle which is running on the second driving is decelerated, the exhaust sound of the internal combustion engine is obtained when the hybrid electric vehicle runs the downward slope on the second driving. Since the driver of the hybrid electric vehicle can obtain or sense a feeling of deceleration through hearing from this exhaust sound, the driver can be given a feeling of sporty drive.

Since there is a difference between a feeling of deceleration obtained during the first driving and a feeling of deceleration obtained during the second driving, hunting or fluctuations are generated in the feeling of deceleration when the driving is switched over frequently between the first driving and the second driving. However, as long as the condition based on the gradient of the downward slope is satisfied in the invention of (2), it is possible to provide the stable feeling of deceleration by restricting the switch from the second driving to the first driving.

According to the invention of (3) and 7, when a request for a switch to the second driving is made while the hybrid electric vehicle runs the downward slope on the first driving, the driving of the hybrid electric vehicle is switched to the second driving. In the event that the request for a switch to the second driving is based on the operation of the driver, the hybrid electric vehicle can be driven according to the intention of the driver irrespective of the gradient of the downward slope, and not only a feeling of deceleration through hearing but also a stable feeling of deceleration can be provided.

According to the invention of (4) and (8), by restricting the switch from the second driving to the first driving when the gradient is equal to or greater than the threshold value, the hybrid electric vehicle is caused to hold the second driving even though the control portion obtains the request for a switch to the first driving while the hybrid electric vehicle runs the downward slope on the second driving. Although a phenomenon in which the exhaust sound of the internal combustion engine is lost or the feeling of deceleration fluctuates is generated when the driving of the hybrid electric vehicle is switched to the first driving, since such a phenomenon is prevented from occurrence in case the hybrid electric vehicle is caused to hold the second driving, the driver of the hybrid electric vehicle is prevented from feeling a sensation of physical disorder.

According to the invention of (5) and (9), since the hybrid electric vehicle runs the downward slope on the first driving when the driving speed is less than the threshold value, it is possible to prevent the provision of a feeling of excessive deceleration by means of the braking force of the internal combustion engine or the deterioration of drivability.

According to the invention of (6) and (10), in the event that the motor generates electric power needed by the accessories by activating the motor to perform a regenerative operation when the hybrid electric vehicle runs the downward slope, it is possible to prevent the deterioration of the state of charge of the battery which supplies electric power to the accessories.

MODE FOR CARRYING OUT THE INVENTION

Hereinafter, an embodiment of a hybrid electric vehicle (HEV: Hybrid Electric Vehicle) according to the invention will be described by reference to the drawings.

Figure 1:
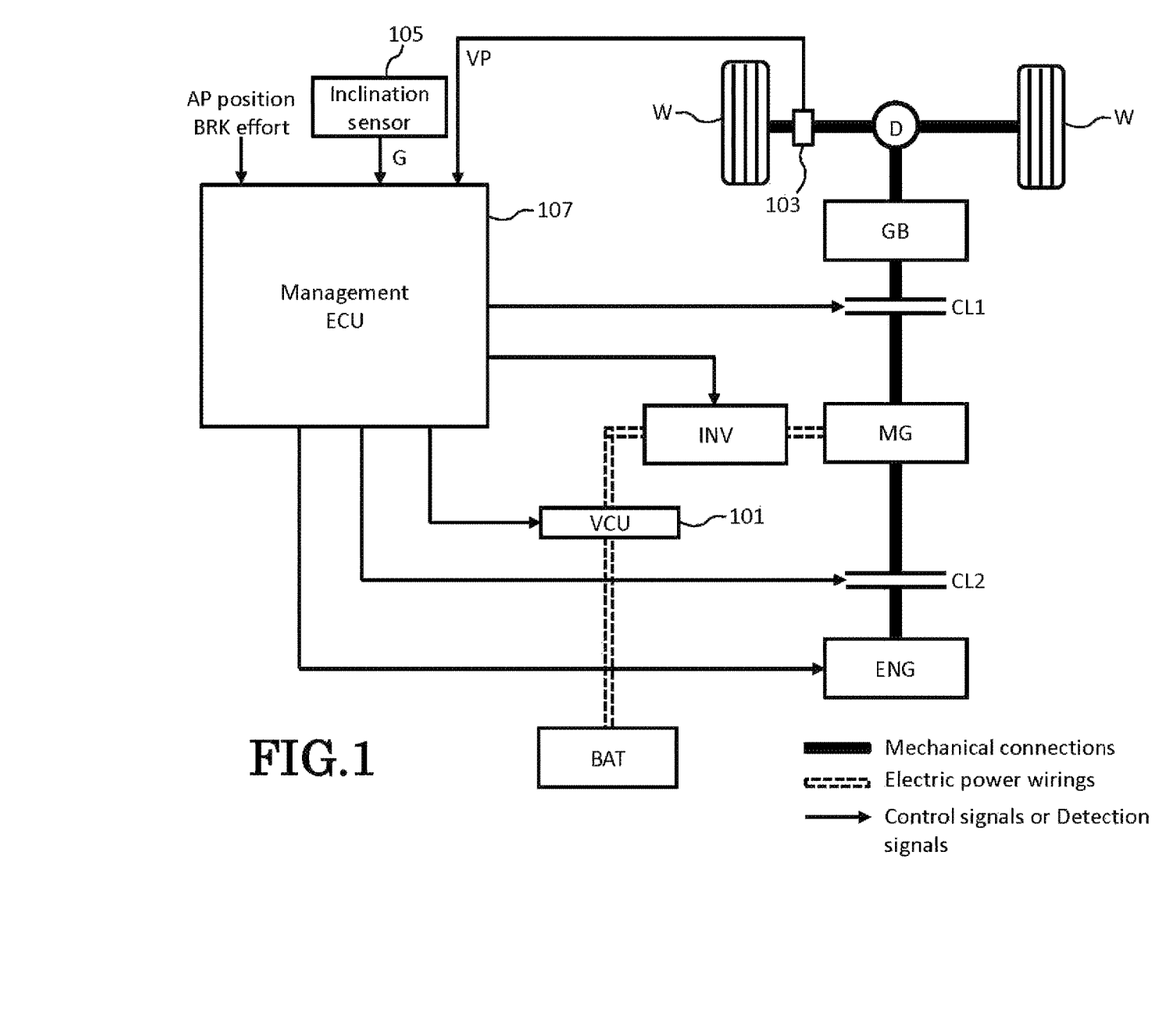
FIG. 1 is a block diagram showing an internal configuration of a hybrid electric vehicle.

FIG. 1 is a block diagram showing an internal configuration of a hybrid electric vehicle. A hybrid electric vehicle (hereinafter, referred to simply as a "vehicle") shown in FIG. 1 includes an internal combustion engine ENG, a motor-generator MG, a battery BAT, a VCU (Voltage Control Unit) 101, an inverter INV, clutches CL1, CL2, a vehicle speed sensor 103, an inclination sensor 105 and a management ECU (Electric Control Unit) 107 and is configured to be driven by means of power of the internal combustion engine ENG and/or the motor-generator MG according to a running state of the vehicle. In FIG. 1, thick solid lines denote mechanical connections, double chain double-dashed lines denote electric power wirings, and thin solid lines denote control signals or detection signals.

The internal combustion engine ENG outputs a driving force for driving the vehicle. Torque generated in the internal combustion engine ENG is transmitted to driving wheels W by way of the clutches CL1, CL2, the motor-generator MG, a gearbox GB including speed gears and a speed reducer D. The motor-generator MG outputs a driving force for driving the vehicle. Torque generated in the motor-generator MG is transmitted to the driving wheels W by way of the clutch CL1, the gearbox GB and the speed reducer D. Additionally, the motor-generator MG can function as a generator (performing a regenerative operation) when the vehicle is slowed down through application of brakes.

The battery BAT has a plurality of battery cells which are connected in series or parallel and supplies a high voltage in the range of 100 to 200V, for example. The battery cells are, for example, lithium ion battery cells or nickel-metal hydride battery cells. The VCU 101 increases the direct-current output voltage of the battery BAT as it is. The VCU 101 decreases the voltage of direct-current electric power which is generated by the motor-generator MG when the motor-generator MG performs a regenerative operation and is then converted into direct current. The electric power whose voltage is decreased by the VCU 101 is stored in the battery BAT. The inverter INV converts direct current voltage into alternating current voltage and supplies three-phase current to the motor-generator MG. The inverter INV converts an alternating current voltage which is generated by the motor-generator MG when the motor-generator MG performs a regenerative operation into a direct current voltage.

The clutch CL1 is engaged or disengaged to connect or disconnect a power transmission path between the gearbox GB and the motor-generator MG in response to an instruction from the management ECU 107. The clutch CL2 is engaged or disengaged to connect or disconnect a power transmission path between the motor-generator MG and the internal combustion engine ENG in response to an instruction from the management ECU 107.

The vehicle speed sensor 103 detects a driving speed (a vehicle speed VP) of the vehicle. A signal that indicates the vehicle speed VP detected by the vehicle speed sensor 103 is sent to the management ECU 107. The inclination sensor 105 detects a gradient of a road surface on which the vehicle is being driven. A signal signaling the gradient (the inclination angle) G of the road surface detected by the inclination sensor 105 is sent to the management ECU 107.

The management ECU 107 controls, as will be described later, the selection of driving modes of the vehicle, the driving of the internal combustion engine ENG, and the driving of the motor-generator MG through controls by the VCU 101 and the inverter INV. The management ECU 107 receives various signals including a signal signaling an accelerator pedal position (an AP position) which corresponds to an accelerator pedal operation by the driver of the vehicle, a signal signaling brake pedal effort (BRK effort) which corresponds to a brake pedal operation by the driver of the vehicle, a signal signaling a vehicle speed VP which is sent from the vehicle speed sensor 103, and a signal signaling a gradient G of a road surface which is sent from the inclination sensor 105. The management ECU 107 determines respective powers which the internal combustion engine ENG and the motor-generator MG output based on the AP position and the vehicle speed VP which the management ECU 107 receives.

The vehicle of this embodiment is driven on anyone of an "EV driving mode," an "assisted driving mode," and an "overdrive (OD) driving mode," and the drive source including the internal combustion engine ENG and the motor-generator MG is used differently in these driving modes.

When the vehicle is accelerated on the EV driving mode, the vehicle is driven by means of the power from the motor-generator MG, during which the internal combustion engine ENG is not driven. When the vehicle is decelerated on the EV driving mode, electric power which is obtained as a result of a regenerative operation of the motor-generator MG is stored in the battery BAT. When the vehicle is driven on the EV driving mode, the management ECU 107 applies or engages the clutch CL1 and releases or disengages the clutch CL2.

When the vehicle is accelerated on the assisted driving mode, the vehicle is driven by means of power into which the power from the internal combustion engine ENG and the power from the motor-generator MG are combined. When the vehicle is decelerated on the assisted driving mode, electric power obtained a result of a regenerative operation by the motor-generator MG is stored in the battery BAT, and the internal combustion engine ENG provides a braking force.

When the vehicle is accelerated on the OD driving mode, the vehicle is driven by means of the power from the internal combustion engine ENG, and as this occurs, although a field weakening control is performed on the motor-generator MG so as to enhance the energy efficiency, the motor-generator MG is not driven to output power to drive the vehicle. When the vehicle is decelerated on the OD driving mode, the internal combustion engine ENG provides a braking force. The motor-generator MG may perform a regenerative operation even when the vehicle is decelerated on the OD driving mode. As this occurs, the motor-generator MG generates, for example, electric power which the accessories of the hybrid electric vehicle require.

In the following description, the assisted driving mode and the OD driving mode will be taken as one driving mode which will be referred to as an "ENG driving mode." When the vehicle is driven on the ENG driving mode, the management ECU 107 engages both the clutch CL1 and the clutch CL2.

Next, the control of selection of the driving modes will be described which is performed by the management ECU 107 when the vehicle of the embodiment climbs down a downward slope after it has been driven on a flat road. The gradient G in the following description denotes the gradient of the downward slope.

Figure 2:
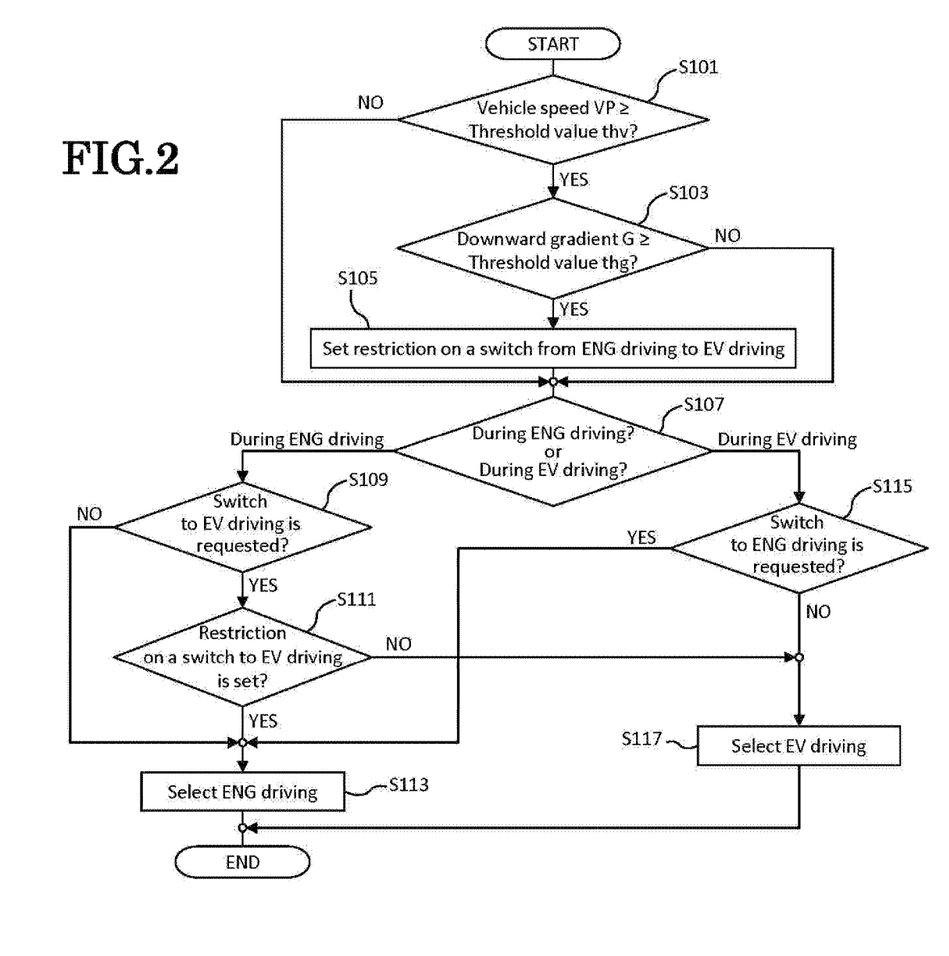
FIG. 2 is a flowchart showing a flow of operations performed by a management ECU in controlling the selection of driving modes.

FIG. 2 is a flowchart showing a flow of operations performed by the management ECU 107 in controlling the selection of the driving modes. As shown in FIG. 2, the management ECU 107 determines whether or not the vehicle speed VP obtained from the vehicle speed sensor 103 is equal to or greater than a threshold value thv (step S101). If it is determined that the vehicle speed is equal to or greater than the threshold value thv, the flow proceeds to step S103, whereas if it is determined that the vehicle speed VP is smaller than the threshold value thv, the flow proceeds to step S107. In step S103, the management ECU 107 determines whether or not the gradient G obtained from the inclination sensor 105 is equal to or greater than a threshold value thg. If it is determined that the gradient G is equal to or greater than the threshold value thg, the flow proceeds to step S105, whereas if it is determined that the gradient G is smaller than the threshold value thg, the flow proceeds to step S107.

In step S105, the management ECU 107 sets a restriction which restricts a switch from the ENG driving mode to the EV driving mode. Namely, once the management ECU 107 sets the restriction, the management ECU 107 restricts a switch to the EV driving mode while the vehicle is driven on the ENG driving mode. Next, in step S107, the management ECU 107 determines whether the driving mode of the vehicle is the ENG driving mode or the EV driving mode. If it is determined that the vehicle is being driven on the ENG driving mode, the flow proceeds to step S109, whereas if it is determined that the vehicle is being driven on the EV driving mode, the flow proceeds to step S115.

In step S109, the management ECU 107 determines whether or not a request for a switch to the EV driving mode has been made based on a judgment which gives importance to the energy efficiency. If it is determined that the request for a switch to the EV driving mode has been made, the flow proceeds to step S111, whereas if it is determined that the request has not been made, the flow proceeds to step S113. In step S111, the management ECU 107 determines whether or not the restriction on the switch from the ENG driving mode to the EV driving mode has been set. If it is determined that the restriction has been set, the flow proceeds to step S113, whereas if it is determined that the restriction has not been set, the flow proceeds to step S117. In step S113, the management ECU 107 selects the ENG driving mode as the driving mode of the vehicle.

In step S115, the management ECU 107 determines whether or not a request for a switch to the ENG driving mode has been made based on a judgment which gives importance to the energy efficiency and the driver's request. If it is determined that the request for a switch to the ENG driving mode has been made, the flow proceeds to step S113, whereas if it is determined that the request has not been made, the flow proceeds to step S117. In step S117, the management ECU 107 selects the EV driving mode as the driving mode of the vehicle.

Figure 3:
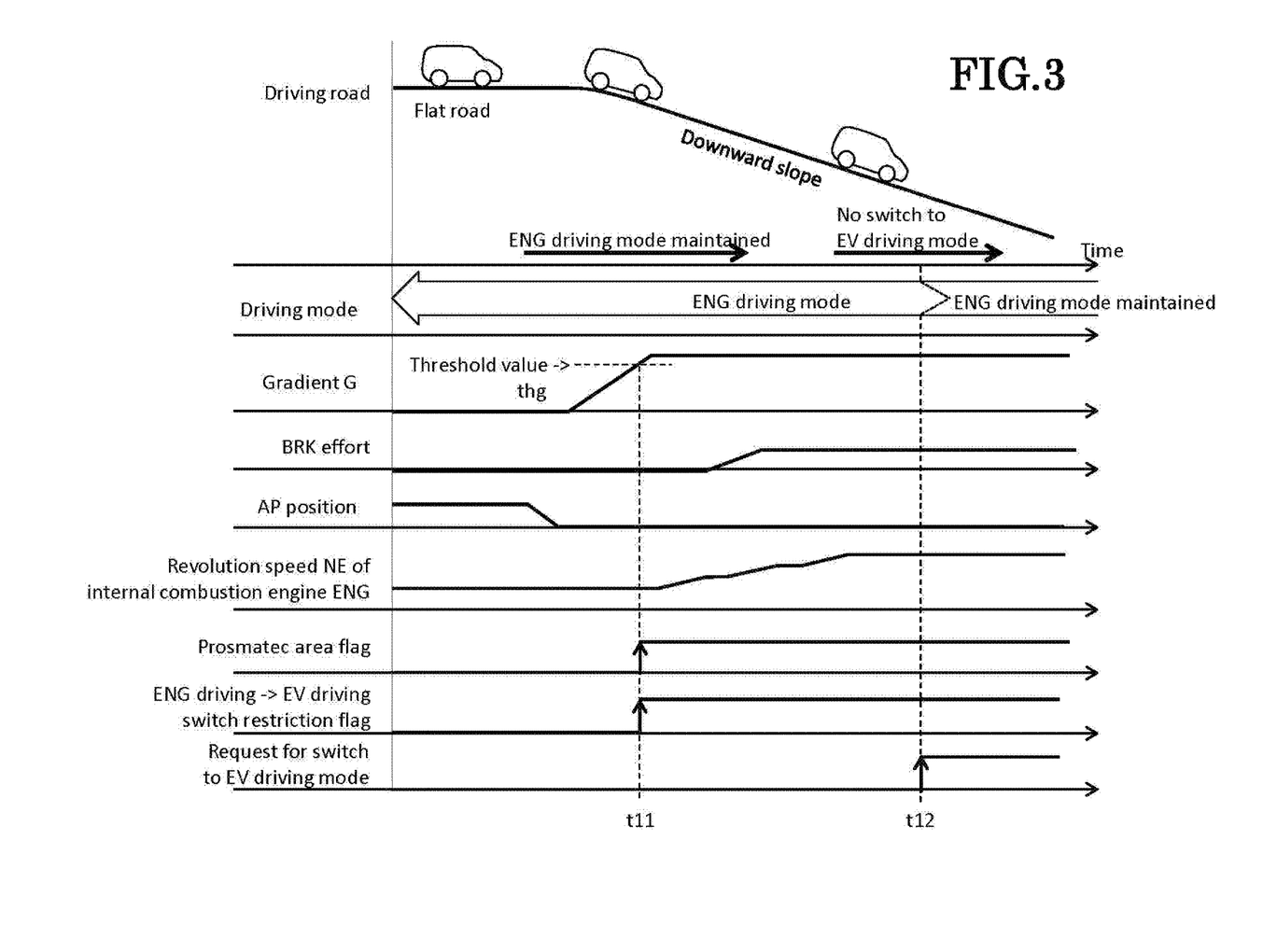
FIG. 3 is a timing chart showing an example of a change with time in a driving mode and various parameters when a vehicle which has been driven on an ENG driving mode on a flat road climbs down a downward slope.
Figure 4:
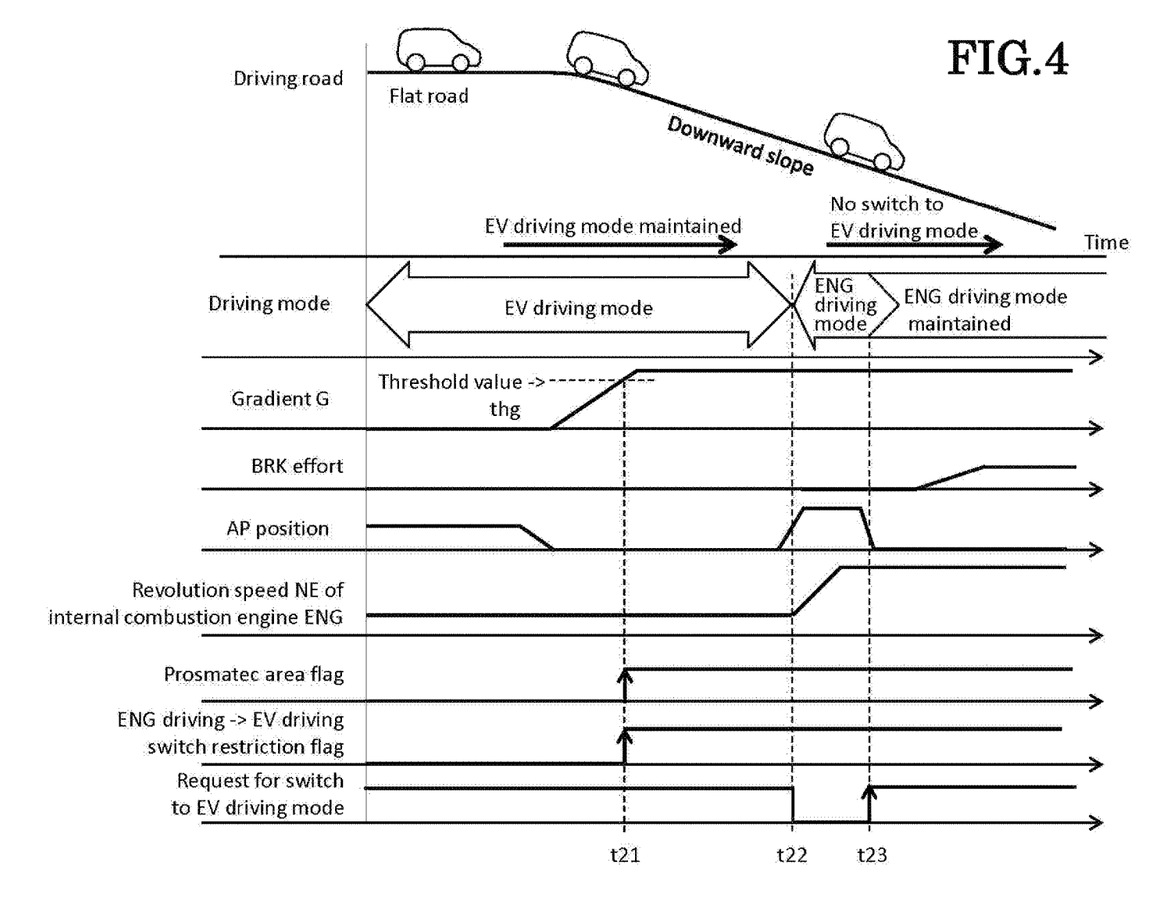
FIG. 4 is a timing chart showing an example of a change with time in a driving mode and various parameters when a vehicle which has been driven on an EV driving mode on a flat road climbs down a downward slope.
Figure 5:
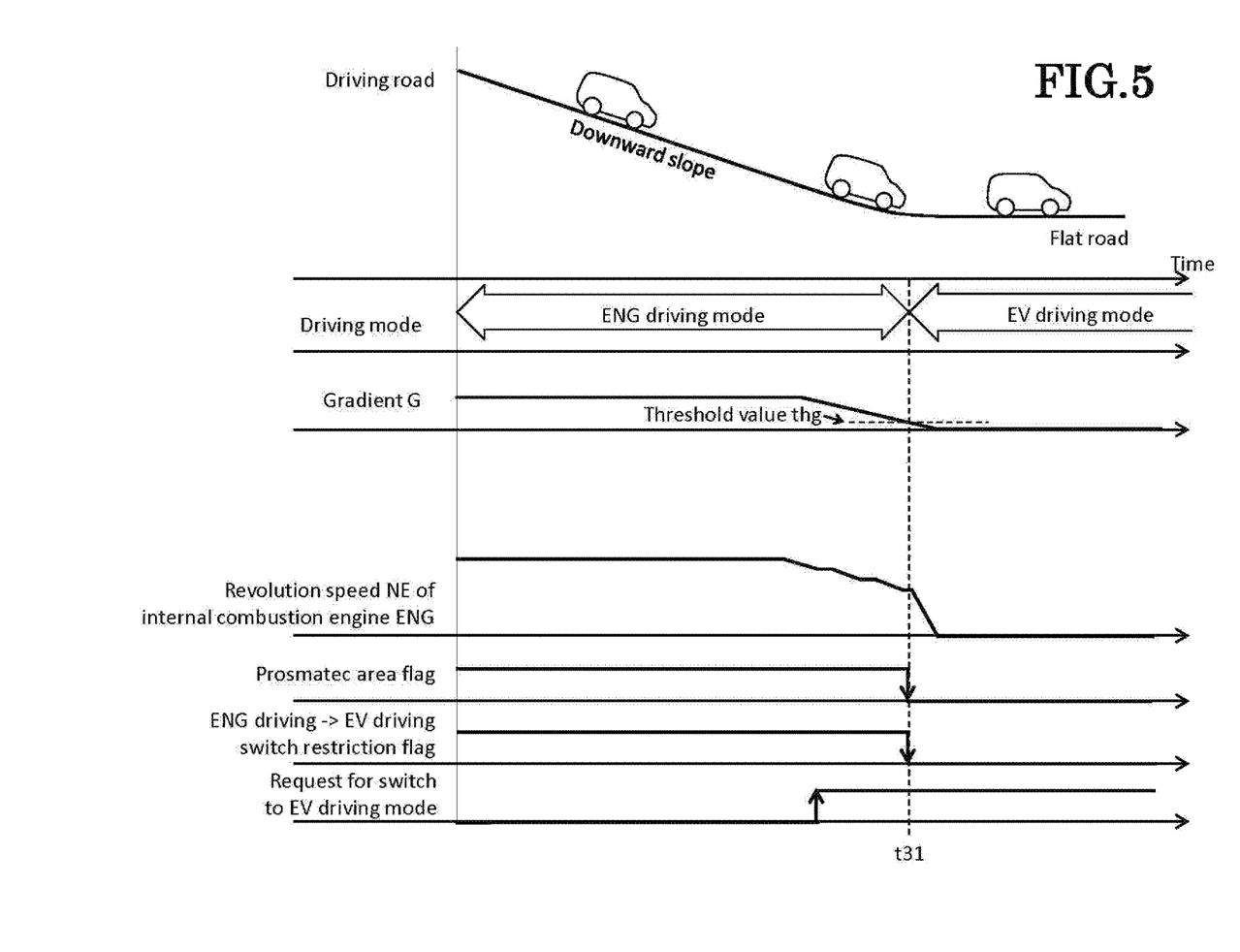
FIG. 5 is a timing chart showing an example of a change with time in a driving mode and various parameters when a vehicle which has climbed down a downward slope on an ENG driving mode is driven on a flat road.

Hereinafter, how the driving modes are selected when the selection control of the driving modes is performed in the way described above will be described for each driving case by reference to FIGS. 3 to 5. FIG. 3 is a timing chart showing an example of a change with time in the driving mode and various parameters when the vehicle which has been driven on the ENG driving mode on a flat road climbs down a downward slope. FIG. 4 is a timing chart showing an example of a change with time in the driving mode and the various parameters when the vehicle which has been driven on the EV driving mode on the flat road climbs down the downward slope. FIG. 5 is a timing chart showing a change with time in the driving mode and the various parameters when the vehicle which has climbed down a downward slope on the ENG driving mode is driven on a flat road. In the examples shown in FIGS. 3 to 5, the vehicle is driven at a vehicle speed VP which is equal to or faster than the threshold value thv.

In the example shown in FIG. 3, the management ECU 107 sets a flag which permits the Prosmatec control and a flag (an EV switch restricting flag) which restricts the switch from the ENG driving mode to the EV driving mode at a point in time (t11) when the gradient G of the downward slope on which the vehicle which has been driven on the ENG driving mode on the flat road climbs down becomes equal to or greater than the threshold value thg. Thereafter, when the vehicle climbs down the downward slope whose gradient G is equal to or greater than the threshold value thg on the ENG driving mode, the management ECU 107 holds the driving mode of the vehicle to the ENG driving mode even though a request for a switch to the EV driving mode is made based on the judgment which gives importance to the energy efficiency in case the EV switch restricting flag is set.

In the example shown in FIG. 4, the management ECU 107 sets the flag which permits the Prosmatec control and the flag (the EV switch restricting flag) which restricts the switch from the ENG driving mode to the EV driving mode at a point in time (t21) when the gradient G of the downward slope on which the vehicle which has been driven on the EV driving mode on the flat road climbs down becomes equal to or greater than the threshold value thg. Thereafter, when the vehicle climbs down the downward slope whose gradient G is equal to or greater than the threshold value thg on the EV driving mode, the management ECU 107 switches the driving mode of the vehicle to the ENG driving mode in the event that a request for a switch to the ENG driving mode is made based on the judgment which gives importance to the energy efficiency in case the EV switch restricting flag is set. Thereafter, with the EV switch restricting flag set, the management ECU 107 holds the driving mode of the vehicle to the ENG driving mode even though a request for a switch to the EV driving mode is made based on the judgment which gives importance to the energy efficiency.

In the example shown in FIG. 5, the management ECU 107 sets down not only the flag which permits the Prosmatec control at a point in time (t31) but also the flag (the EV switch restricting flag) which restricts the switch from the ENG driving mode to the EV driving mode when a gradient G of a portion of the downward slope on which the vehicle which has climbed down the downward slope on the ENG driving mode is now climbing down just before the vehicle reaches a flat road becomes smaller than the threshold value thg. At this point in time, in the event that a request for a switch to the EV driving mode is made based on the judgment which gives importance to the energy efficiency, the management ECU 107 switches the driving mode of the vehicle to the EV driving mode.

Thus, as has been described heretofore, according to this embodiment, in the event that the gradient G of the downward slope on which the hybrid electric vehicle climbs down is equal to or greater than the threshold value thg, the switch from the ENG driving mode to the EV driving mode is restricted, whereby even though a request for a switch to the EV driving mode is made while the vehicle is climbing down the downward slope, the driving mode of the hybrid electric vehicle is held to the ENG driving mode. Since the internal combustion engine ENG provides the braking force when the hybrid electric vehicle which is driven on the ENG driving mode is decelerated, the exhaust sound of the internal combustion engine is obtained when the hybrid electric vehicle climbs down the downward slope on the ENG driving mode. Since the driver of the hybrid electric vehicle can obtain or sense a feeling of deceleration through hearing from this exhaust sound, the driver can be given a feeling of sporty drive.

There is a difference between the feeling of deceleration which is obtained during the EV driving and the feeling of deceleration which is obtained during the ENG driving. In particular, when the driving mode of the hybrid electric vehicle is switched from the ENG driving mode to the EV driving mode, the driver of the electric hybrid vehicle will encounter a phenomenon in which the exhaust sound of the internal combustion engine ENG is lost or the feeling of deceleration changes. However, as in this embodiment, in case the hybrid electric vehicle is caused to hold the ENG driving mode, such a phenomenon is not generated. Owing to this, it is possible to provide the stable feeling of deceleration without the driver of the hybrid electric vehicle having to feel a sensation of physical disorder.

When a request for a switch to the ENG driving mode is made while the hybrid electric vehicle is climbing down the downward slope on the EV driving, the driving mode of the hybrid electric vehicle is switched to the ENG driving mode. In the event that the request for a switch to the ENG driving mode is based on the operation of the driver of the hybrid electric vehicle, not only the driving according to the intention of the driver is enabled irrespective of the gradient of the downward slope, but also the stable feeling of deceleration together with the feeling of deceleration through hearing can be provided.

Since the hybrid electric vehicle climbs down the downward slope on the EV driving when the hybrid electric vehicle is driven at such low speeds that the vehicle speed VP is slower than the threshold value thv, the driver of the hybrid electric vehicle can be prevented from sensing a feeling of excessive deceleration or encountering the deterioration in drivability both of which could be caused by the braking force of the internal combustion engine ENG when the hybrid electric vehicle is driven at low speeds on the ENG driving.

Further, in case the motor-generator MG performs a regenerative operation to generate electric power required by the accessories of the hybrid electric vehicle when the hybrid electric vehicle climbs down the downward slope, the reduction in SOC (State of Charge) of the battery BAT which supplies electric power to the accessories can be prevented.

Figure 6:
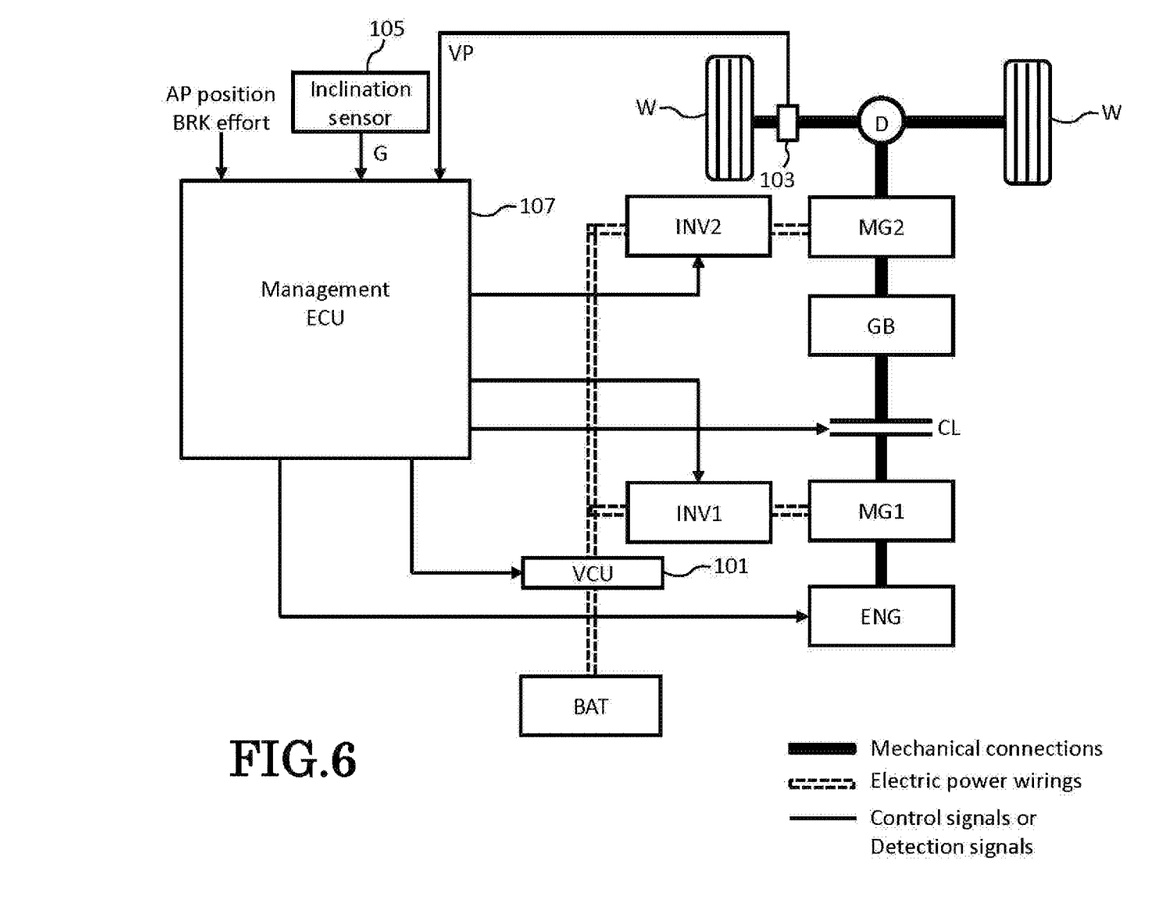
FIG. 6 is a block diagram showing an internal configuration of an HEV which can be switched over between a series system and a parallel system.
Figure 7:
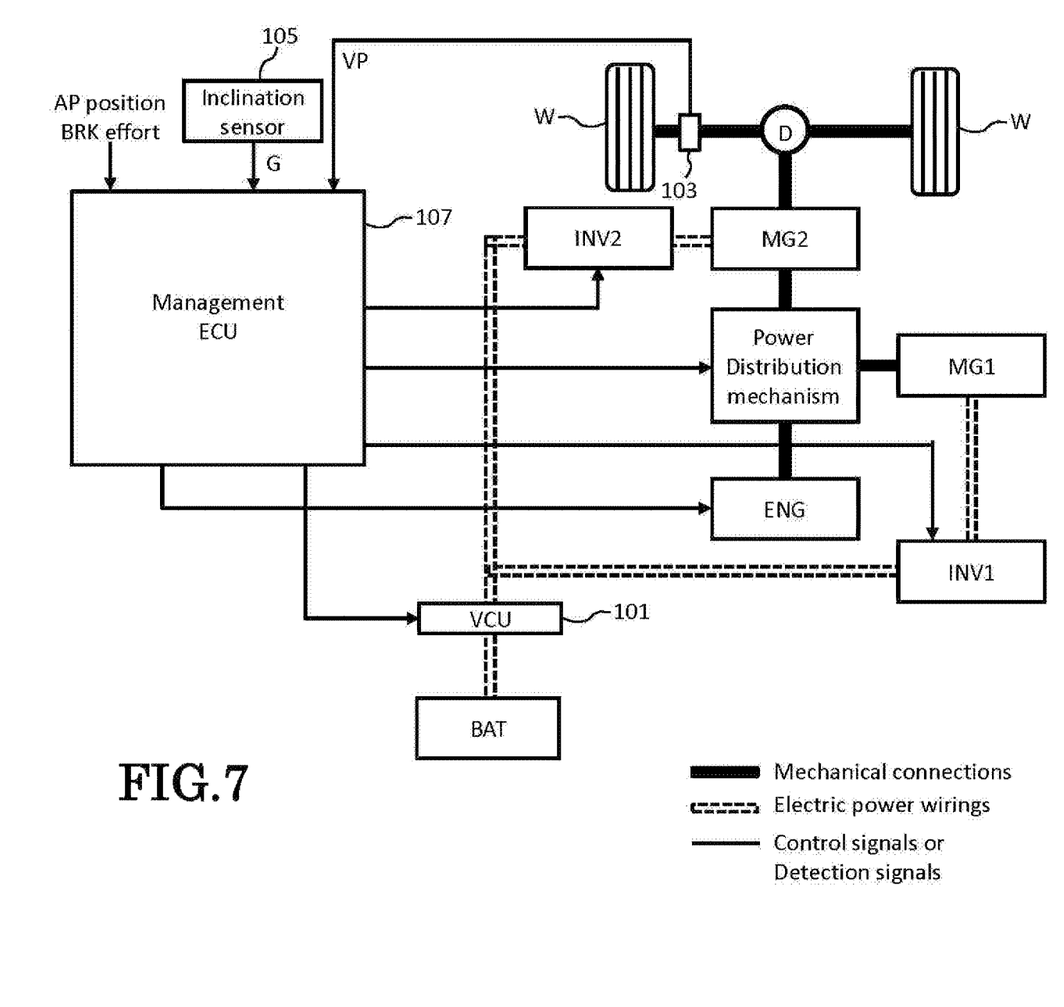
FIG. 7 is a block diagram showing an internal configuration of an HEV which can be switched over between a series system and a parallel system.
Figure 8:
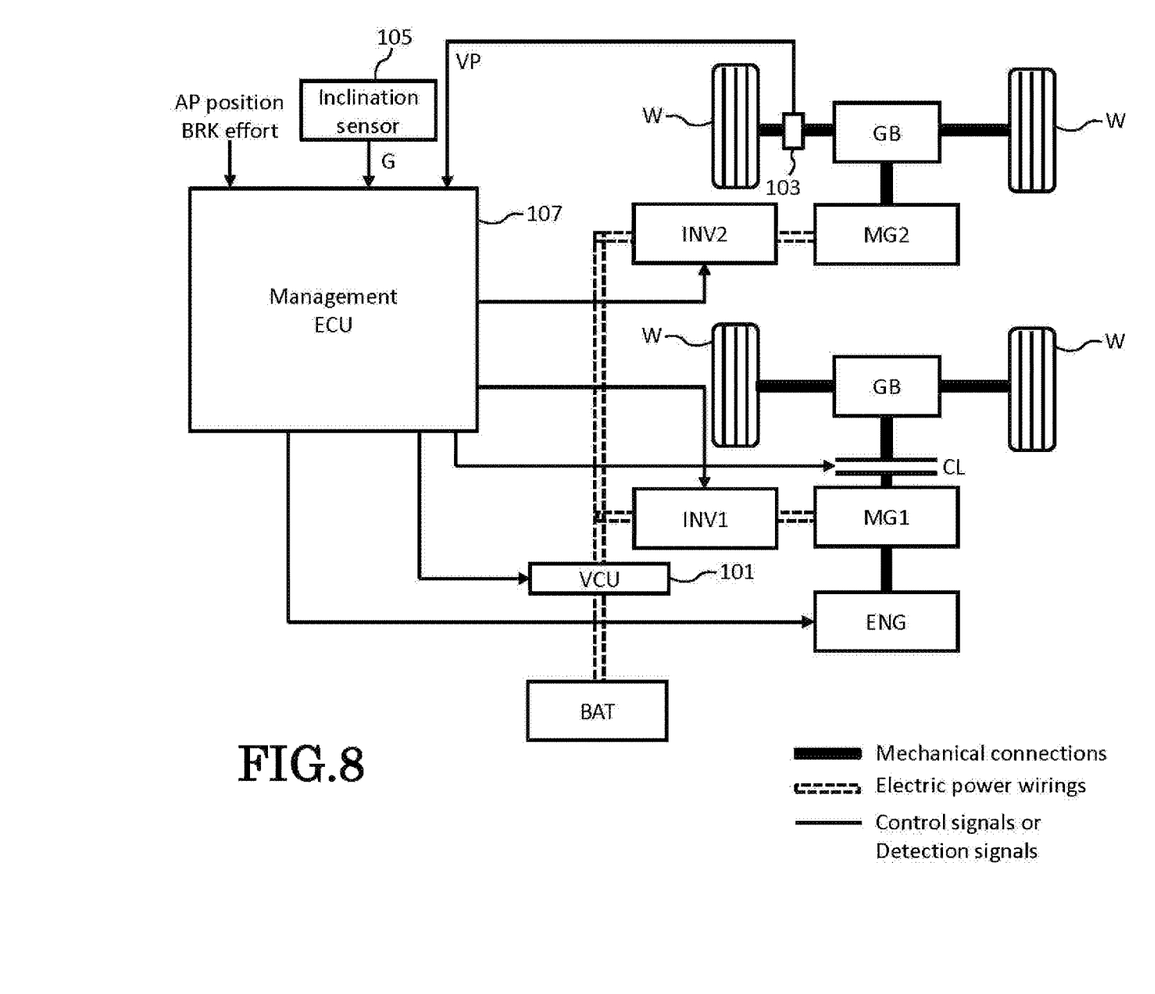
FIG. 8 is a block diagram showing an internal configuration of a two-motor, electric four-wheel drive HEV.
Figure 9:
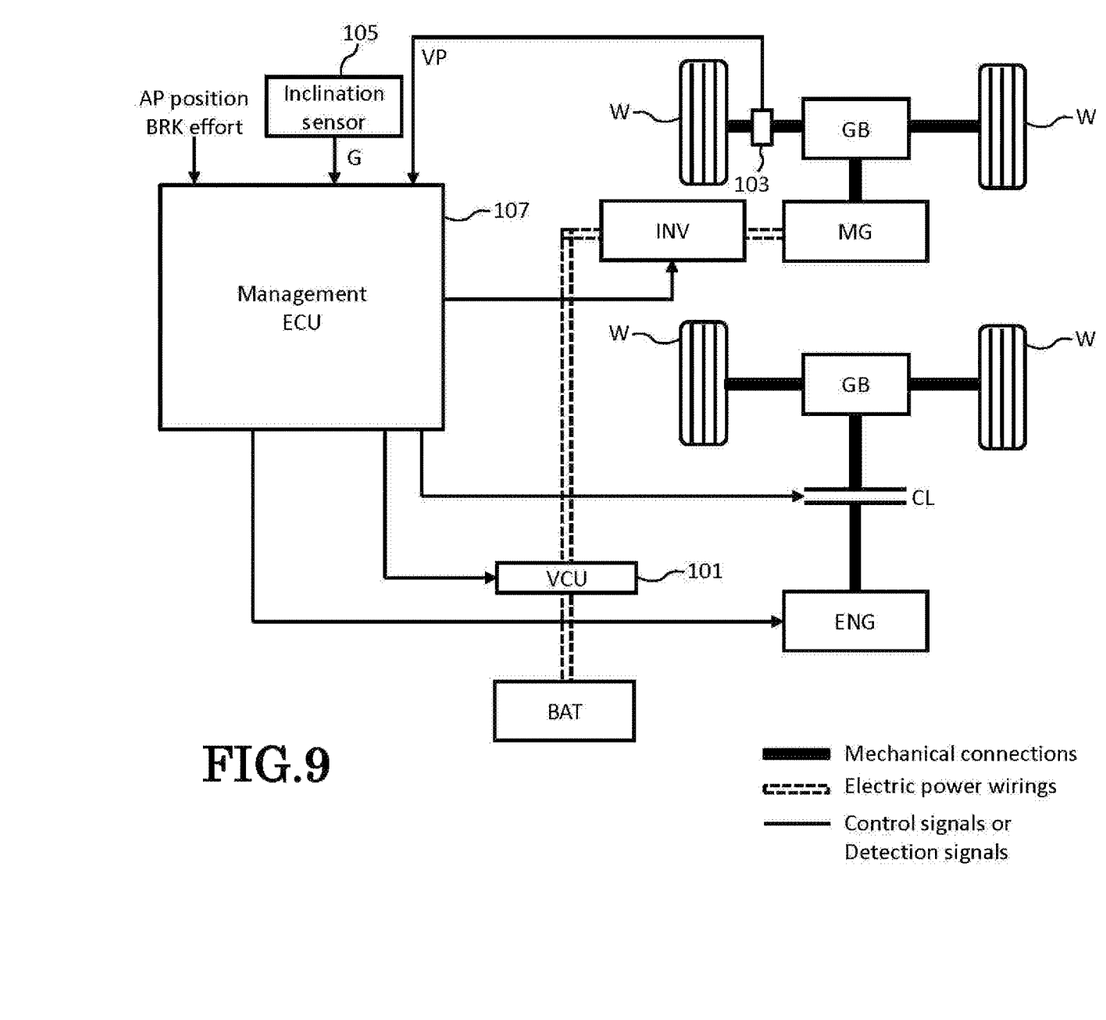
FIG. 9 is a block diagram showing an internal configuration of a single-motor, electric four-wheel drive HEV.
Figure 10:
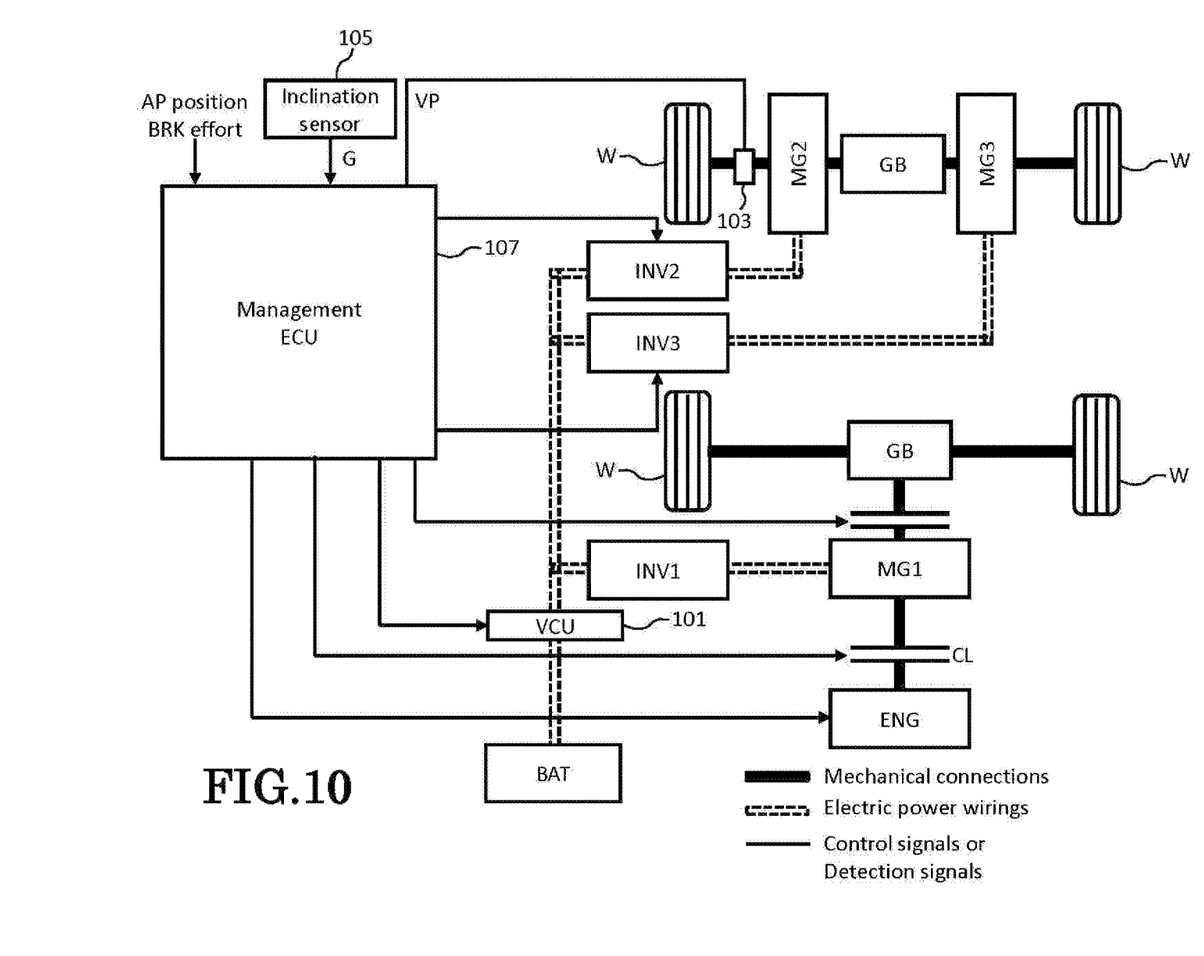
FIG. 10 is a block diagram showing an internal configuration of a three-motor, electric four-wheel drive HEV.
Figure 11:
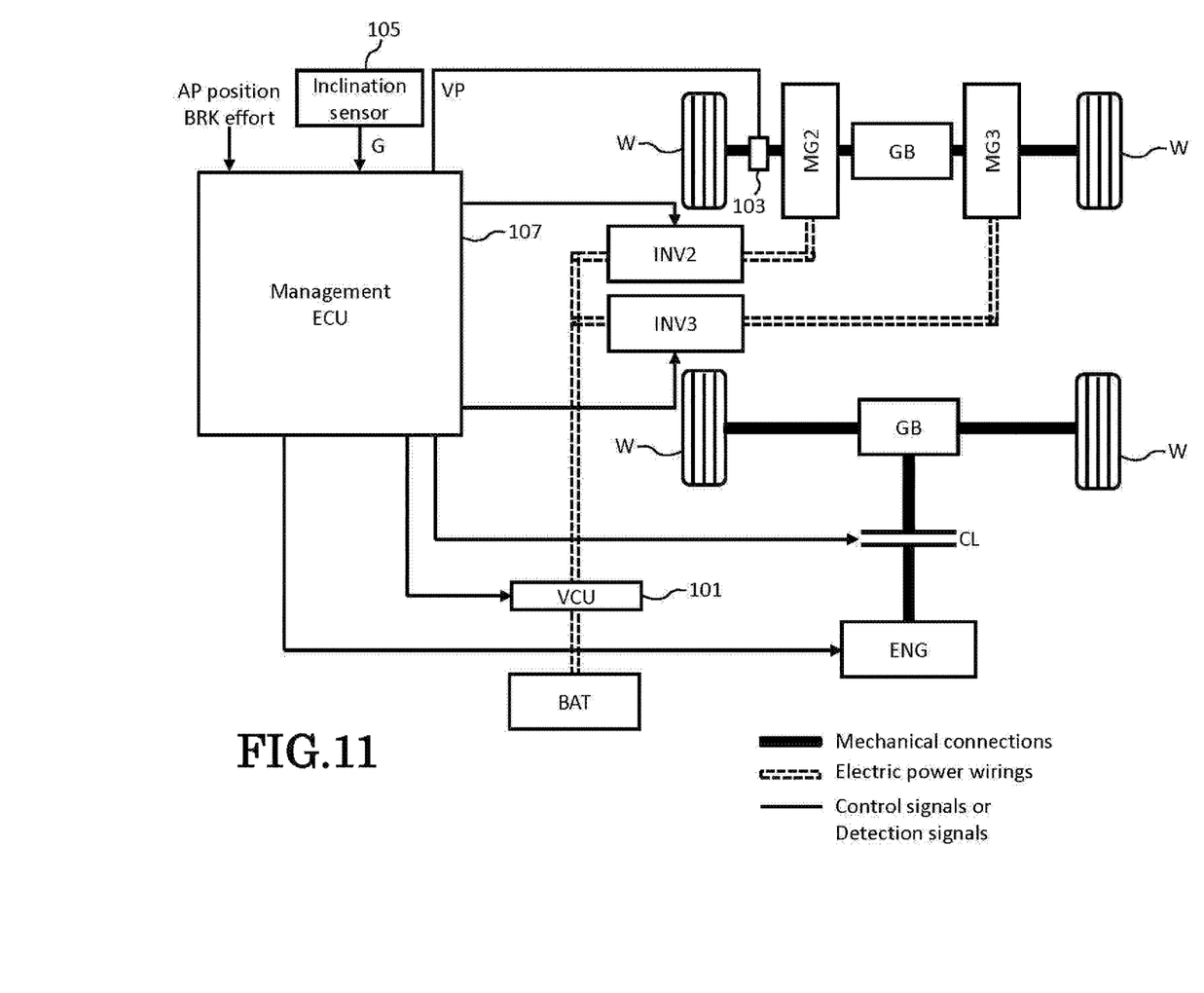
FIG. 11 is a block diagram showing an internal configuration of a two-motor, electric four-wheel drive HEV.

The invention is not limited to the embodiment which has been described heretofore and hence can be modified or improved as required. For example, although the hybrid electric vehicle described above is the parallel HEV, the hybrid electric vehicle may be an HEV which can be switched between the series system and the parallel system as shown in FIGS. 6, 7, a two-motor electric four-wheel drive HEV shown in FIG. 8, a single motor electric four-wheel drive HEV shown in FIG. 9, a three-motor electric four-wheel drive HEV shown in FIG. 10 or a two-motor electric four-wheel HEV shown in FIG. 11.

DESCRIPTION OF REFERENCE NUMERALS AND CHARACTERS

101 VCU
103 vehicle speed sensor
105 inclination sensor
107 management ECU
BAT battery
CL1, CL2 clutch
ENG internal combustion engine
INV inverter
MG motor-generator

The invention claimed is:
1. A hybrid electric vehicle including:
an internal combustion engine;
a motor; and
an engagement and disengagement portion which engages and disengages a power transmission path from the internal combustion engine to a driving wheel,
wherein the hybrid electric vehicle is driven by means of power from at least one of the internal combustion engine and the motor,
wherein the hybrid electric vehicle comprises:
a gradient acquiring portion which acquires a gradient of a road surface on which the hybrid electric vehicle is running; and
a control portion which determines whether the hybrid electric vehicle runs on a first driving by means of power from the motor by releasing the engagement and disengagement portion, or the hybrid electric vehicle runs on a second driving by means of power from at least the internal combustion engine by applying the engagement and disengagement portion, based on (i) a request for a switch between the first driving and the second driving and (ii) a gradient, which is obtained by the gradient acquiring portion, of a downward slope where the hybrid vehicle is running, and
wherein the control portion restricts a switch from the second driving to the first driving when the gradient is equal to or larger than a first threshold value,
wherein the control portion does not restrict the switch from the second driving to the first driving when the gradient is smaller than the first threshold value, wherein the control portion holds the second driving when the switch from the second driving to the first driving is restricted, even though the control portion obtains a request for a switch to the first driving while the hybrid electric vehicle runs the downward slope on the second driving, and wherein the control portion switches to the first driving when the switch from the second driving to the first driving is not restricted, in a case where the control portion obtains the request for the switch to the first driving while the hybrid electric vehicle runs the downward slope on the second driving.

2. The hybrid electric vehicle according to claim 1, wherein the control portion switches from the first driving to the second driving when the control portion obtains a request for a switch to the second driving while the hybrid electric vehicle runs a downward slope on the first driving.

3. The hybrid electric vehicle according to claim 1, wherein the control portion holds the second driving when the switch from the second driving to the first driving is restricted, even though the control portion obtains a request for the switch to the first driving after the control portion switches from the first driving to the second driving.

4. The hybrid electric vehicle according to claim 1, wherein the control portion holds the first driving when the control portion restricts the switch from the second driving to the first driving while the hybrid electric vehicle runs the downward slope on the first driving, unless the control portion obtains a request for a switch to the second driving after the control portion restricts the switch from the second driving to the first driving.

5. The hybrid electric vehicle according to claim 1, wherein the control portion holds the first driving when the control portion restricts the switch from the second driving to the first driving while the hybrid electric vehicle runs the downward slope on the first driving, unless the control portion obtains a request for a switch to the second driving based on an operation of a driver after the control portion restricts the switch from the second driving to the first driving.

6. The hybrid electric vehicle according to claim 1, wherein the control portion determines, irrespective of the gradient, that the hybrid electric vehicle runs on the first driving when a driving speed of the hybrid electric vehicle is less than a second threshold value.

7. The hybrid electric vehicle according to claim 1, wherein the control portion controls the motor to regenerate while the hybrid electric vehicle runs the downward slope on the first driving or on the second driving.

* * * * *